Nov. 27, 1928.                                          1,692,816
E. A. CHAMBERLIN
HUMIDIFIER
Filed Sept. 30, 1927
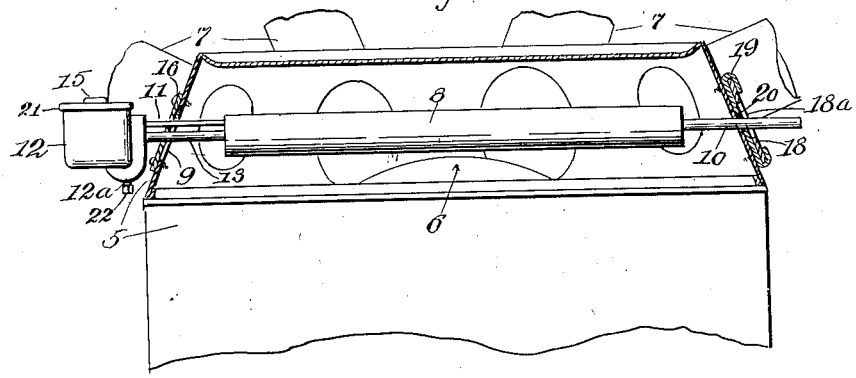
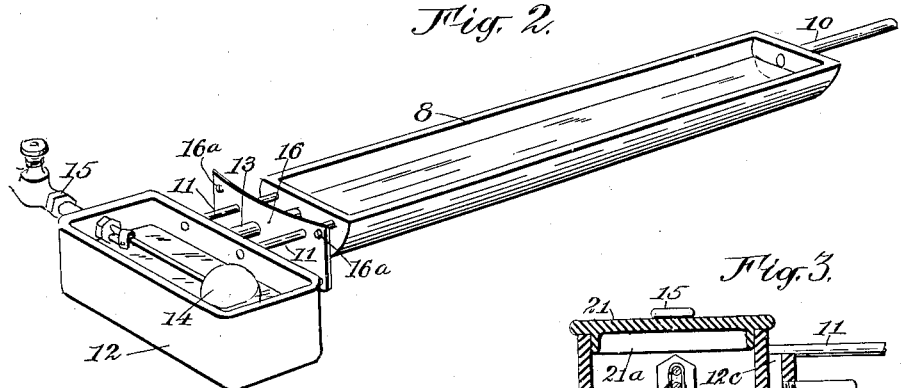
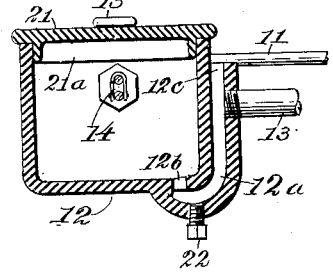
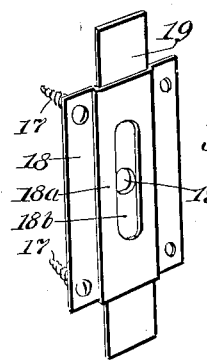
Inventor
Earl A. Chamberlin
By J. M. St. John
Attorney Patented Nov. 27, 1928.

UNITED STATES PATENT OFFICE.

EARL A. CHAMBERLIN, OF CEDAR RAPIDS, IOWA.

HUMIDIFIER.

Application filed September 30, 1927. Serial No. 223,139.

This invention relates to the diffusion of moisture from a source of heat into the air of living apartments, the object of the invention being to provide apparatus adapted for use in connection with furnaces whereby a large supply of humid vapor may be automatically supplied to such apartments.

The nature of the invention is fully disclosed in the description and claims following, reference being had to the accompanying drawing, in which:—

Fig. 1 is a side elevation of my improved humidifier as applied to a hot air furnace, a part of the upper portion of which is shown, and this partly in section. Fig. 2 is a view in perspective of the humidifier detached. Fig. 3 is a cross section of the valve chamber through its trap. Fig. 4 shows in perspective an adjustable support for one end of the evaporation pan, and by means of which the pan may be easily leveled.

In the drawing, the numeral 5 denotes a hot-air jacket of a familiar type for a hot-air furnace, of which the dome of the combustion chamber, 6 only is shown. This upper portion of the furnace jacket usually holds a larger body of heat than any other part of the jacket, and therefore is the best adapted for the installation of apparatus to hold water for evaporation and its immediate diffusion and distribution through the hot-air pipes 7.

The water container for such evaporation is preferably a long pan or trough 8, slim enough to pass through a comparatively small hole 9 cut in the jacket, but holding a considerable volume of water. In practice the pan is best made of cast aluminum, which is durable, and appears to give out an excess of evaporation as compared with other metals and types of pans. One end of the pan is provided with a short length of pipe 10, which serves as a support for this end of the pan, and also as an overflow tell-tale in case the pan should become too full through any fault in the feed-water mechanism, to be described presently. The other end of the pan connects by a pair of rods 11 with a valve-chamber 12, above the water line, and below the same by a pipe 13. The valve-chamber is provided with a float-valve 14 of a simple and familiar type, to shut off the water from its source of supply (the city water system, for example) when it reaches a predetermined level in the chamber and pan, slightly below the outlet or overflow pipe. The water-supply source is indicated by a service valve and pipe 15.

It will be noted that the pipe 13 connects with the valve chamber by a trap 12$^a$, which has not only the outlet 12$^b$, but is also open at 12$^c$. This gives an air-free passage for the water from the valve-chamber to the pan, and prevents any possible bubbling or water-hammer in the valve chamber should there be excessive heat in the water contained in the pan. Evidently back-water from the pan will simply flow freely, as water or steam, with no disturbance of the float or valve.

Before the valve chamber and pan are connected a sheet metal plate 16 is slipped on the rods and pipe, to serve as a support for the chamber and the adjacent end of the pan. For this purpose it is pierced with screw-holes 16$^a$, and is secured to the furnace jacket by screws 17 (Fig. 4), which are of a suitable type to hold in simple holes punched in the jacket, and without nuts.

The mounting for the opposite end of the pan is shown in Fig. 4. This is a sheet metal plate 18, offset at 18$^a$, and provided with a slot 18$^b$ to permit the pipe 10 to pass through, and move a limited distance up and down. In the offset is placed a slide 19 pierced with a hole 19$^a$ to receive the pipe. In the jacket is made a fairly large hole 20, to allow for the necessary movement of the pipe in adjusting to level. The pan being in approximately its proper position, the plate 18 is secured to the jacket by its screws, as above described, and then it is a very simple matter to slip the slide 19 up or down, and when the pan is level, fasten it in position by turning down the upper end of the slide (or both ends, if desired) over the plate 18.

In practice the pan should lie a little above the furnace dome, and not rest upon it, as the weight of anybody resting directly on the dome, when extremely hot, might permanently bend or crack the dome.

The device thus described is very quickly and easily installed; is calculated to give a maximum of humidity to the air inside the house, and with ordinary care will function indefinitely without attention.

A cover 21 protects the contents of the valve-chamber from dust and dirt, and prevents evaporation therefrom. It is preferably provided with an internal flange 21$^a$, so that water boiling up along the sides of the chamber will fall inside the chamber instead of running over the edge outside.

The bottom of the trap is provided with a drain-plug 22, by the removal of which either the pan or valve chamber may be drained for the removal of dirt or other obstructing matter.

Having thus described my invention, I claim:

1. A humidifier, comprising a pan adapted for insertion in the upper part of a furnace jacket, means for supporting the pan, a plate carried thereby and adapted to close the opening for the pan in the furnace jacket, a valve-chamber formed with a trap open at its upper end, and serving as an outer receptacle for water, and a pipe connecting one end of the pan with said trap.

2. A humidifier, comprising in combination, a pan adapted for insertion in the upper part of a furnace jacket, an outer water receptacle connecting with one end of the pan by support-rods, a connecting pipe, a plate carried by said rods, with means for attaching the plate to the furnace jacket, an overflow pipe at the other end of the pan, a support therefor, and means for attaching said support to the furnace jacket.

3. A humidifier, comprising in combination a long, slim pan adapted for insertion in the upper part of a furnace jacket, a water-supplying receptacle and a connecting pipe, supporting rods connecting the pan and receptacle, a sheet-metal plate and means for attaching the same to the furnace jacket to support the receptacle and one end of the pan, an overflow pipe extending from the opposite end of the pan, a slotted plate through which the pipe projects, and means for securing the same to the furnace jacket, and a slide movable in and attachable adjustably to said slotted plate, whereby the pan is supported and leveled.

4. In a humidifier, the combination with a furnace jacket having an opening in the upper portion at one side, an evaporating pan insertable in said opening over the furnace dome, an external water receptacle provided with a trap open to the air, a connecting water pipe, and a plate strung on the pipe and adapted to close the pan-hole in the furnace jacket.

In testimony whereof I affix my signature.

EARL A. CHAMBERLIN.